US012228136B2

(12) United States Patent
Rapp et al.

(10) Patent No.: US 12,228,136 B2
(45) Date of Patent: Feb. 18, 2025

(54) MOTOR FOR A VENTILATION DEVICE OF A HEATING, VENTILATION AND/OR AIR CONDITIONING SYSTEM OF A MOTOR VEHICLE WITH A ROTOR AND STATOR DECOUPLED FROM A MOUNTING BASE

(71) Applicant: Valeo Systemes Thermiques, Le Mesnil Saint-Denis (FR)

(72) Inventors: Benjamin Rapp, Le Mesnil-Saint-Denis (FR); Maurad Berkouk, Le Mesnil-Saint-Denis (FR)

(73) Assignee: VALEO SYSTEMES THERMIQUES, Le Mesnil-Saint-Denis (FR)

( * ) Notice: Subject to any disclaimer, the term of this patent is extended or adjusted under 35 U.S.C. 154(b) by 85 days.

(21) Appl. No.: 17/786,877

(22) PCT Filed: Dec. 7, 2020

(86) PCT No.: PCT/FR2020/052293
§ 371 (c)(1),
(2) Date: Jun. 17, 2022

(87) PCT Pub. No.: WO2021/123547
PCT Pub. Date: Jun. 24, 2021

(65) Prior Publication Data
US 2023/0036988 A1 Feb. 2, 2023

(30) Foreign Application Priority Data

Dec. 19, 2019 (FR) ........................................ 1914818

(51) Int. Cl.
*F04D 25/06* (2006.01)
*F04D 29/66* (2006.01)
(Continued)

(52) U.S. Cl.
CPC ....... *F04D 25/0606* (2013.01); *F04D 29/668* (2013.01); *H02K 1/187* (2013.01); *H02K 5/24* (2013.01)

(58) Field of Classification Search
CPC ... F04D 25/0606; F04D 29/668; H02K 1/187; H02K 5/24; H02K 5/16
See application file for complete search history.

(56) References Cited

U.S. PATENT DOCUMENTS 9,660,498 B2 * 5/2017 Truillet ..................... H02K 5/24
2001/0032600 A1 * 10/2001 Minegishi ........... F02B 27/0294
123/41.1
(Continued)

FOREIGN PATENT DOCUMENTS

FR 3050490 A1 * 10/2017 ......... F04D 25/0613
WO 2009083362 A1 7/2009
(Continued)

OTHER PUBLICATIONS

International Search Report and Written Opinion in corresponding International Application No. PCT/FR2020/052293, dated Mar. 19, 2021 (12 pages).

*Primary Examiner* — Dominick L Plakkoottam
(74) *Attorney, Agent, or Firm* — Osha Bergman Watanabe & Burton LLP

(57) ABSTRACT

Disclosed is a motor (14) for a ventilation device (10) of a heating, ventilation and/or air conditioning system of a motor vehicle, comprising a base (34) for mounting the motor (14) on a support (16); a stator (22); a rotor (20) comprising a shaft (30); at least one bearing (74; 80) around the shaft (30) of the rotor (20); and a decoupling ring (58). The decoupling ring (58) comprises an outer part (60) secured to the mounting base (34), an inner part (62) secured to the stator (22) and forming a recess (72; 76) for receiving (Continued)

the bearing (74; 80) around the shaft (30) of the rotor (20), and elastomer material (64) between the inner part (62) and the outer part (60).

9 Claims, 7 Drawing Sheets

(51) Int. Cl.
*H02K 1/18* (2006.01)
*H02K 5/24* (2006.01)

(56) References Cited

U.S. PATENT DOCUMENTS

| | | | |
|---|---|---|---|
| 2008/0296985 A1 | 12/2008 | Fukuno et al. | |
| 2011/0101800 A1* | 5/2011 | Schiel | F16F 15/08 |
| | | | 310/51 |
| 2012/0212110 A1* | 8/2012 | Mueller | H02K 5/24 |
| | | | 310/67 R |
| 2015/0233423 A1* | 8/2015 | Peterson | F16C 43/02 |
| | | | 384/420 |
| 2017/0033640 A1* | 2/2017 | Le Goff | H02K 9/00 |
| 2017/0110932 A1* | 4/2017 | Berkouk | F04D 25/08 |
| 2018/0226857 A1* | 8/2018 | Ishizaki | F04D 29/668 |
| 2019/0028005 A1* | 1/2019 | Ishizaki | H02K 3/28 |

FOREIGN PATENT DOCUMENTS

| | | | | |
|---|---|---|---|---|
| WO | 2011120285 A1 | 10/2011 | | |
| WO | WO-2018146424 A1 * | 8/2018 | | H02K 11/33 |
| WO | 2019180354 A1 | 9/2019 | | |

* cited by examiner

MOTOR FOR A VENTILATION DEVICE OF A HEATING, VENTILATION AND/OR AIR CONDITIONING SYSTEM OF A MOTOR VEHICLE WITH A ROTOR AND STATOR DECOUPLED FROM A MOUNTING BASE

TECHNICAL FIELD

The present disclosure relates to the field of electric motors for a heating, ventilation and/or air conditioning system of a motor vehicle. The present disclosure also relates to an assembly of such a motor and a motor support. Finally, the present disclosure relates to a ventilation device for a motor vehicle ventilation system comprising such a motor or such a motor assembly.

PRIOR ART

Motor vehicles are commonly equipped with a heating, ventilation and/or air conditioning system, comprising a ventilation device which makes it possible to generate a flow of air in the system. Such a system is also able to manage the temperature and distribution, within the vehicle interior, of the air flow created. Such a ventilation device comprises, inter alia, a fan comprising a fan impeller that is driven in rotation by an electric motor. The electric motor is notably an electronically switched electric motor controlled by a power supply module.

An electronically switched electric motor, or brushless direct current motor, has a rotor and stator assembly, each of these components bearing electromagnetic elements whose interaction generates the movement of the rotor in relation to the stator and, ultimately, the movement of the fan impeller.

The electric motor is assembled in the fan or in the heating, ventilation and/or vibration system via a motor support which comprises an inner ring configured to accept the electric motor, and an outer ring able to be fixed, directly or indirectly, to a structural element of the vehicle.

A decoupling element is interposed between the inner ring and the outer ring. This decoupling element is intended to limit, or even to prevent, the transmission of vibration and/or stress generated by the rotation of the electric motor, from the inner ring to the outer ring. This reduces the transmission of vibrations to the ventilation device, which could be felt by the occupants of the vehicle.

The motor support can form one or more recesses for receiving a bearing for guiding the rotation of the rotor.

However, during transport of the motor or fan to the vehicle production plant, the decoupling element is not sufficient to prevent the transmission of vibrations to these bearings. Since the motor is not rotating during this transport phase, the vibrations can cause the grease present in the bearings to move and, ultimately, metal-on-metal contact in the bearings, which damages the bearings. This results in an increase in the level of noise produced by the motor during its operation.

The purpose of the present disclosure is to propose a motor for a ventilation device of a heating, ventilation and/or vibration system of a motor vehicle, limiting the risks of damage to the bearing(s) of the motor.

SUMMARY

To that end, the present document proposes a motor for a ventilation device of a ventilation, air conditioning and/or heating system of a motor vehicle, comprising
a base for mounting the motor on a support,
a stator,
a rotor comprising a shaft,
at least one bearing around the shaft of the rotor,
a decoupling ring comprising an outer part secured to the mounting base, an inner part secured to the stator and forming a recess for receiving the bearing around the shaft of the rotor, and elastomeric material between the inner part and the outer part.

Thus, advantageously, the propagation of the vibrations transmitted to the mounting base towards the shaft of the rotor is attenuated or even prevented by the decoupling ring and, in particular, by the elastomeric material interposed between the inner and outer parts of the decoupling ring. This limits the risk of the grease moving in the bearings, especially during transport of the motor.

According to particular embodiments, the motor may comprise one or more of the following features, taken alone or in combination:
the stator comprises a stator winding support and a stator winding, the inner part of the decoupling ring being preferably made of one piece with the stator winding support;
the stator comprises a stator winding support and a stator winding, the inner part of the decoupling ring and the stator winding support being two separate parts, the inner part of the decoupling ring preferably having at least one relief for guiding the position of the stator winding support and the stator winding support having at least one complementary relief for guiding in position the decoupling ring;
the outer part of the decoupling ring forms pins intended to be received in complementary openings in the mounting base, the pins preferably being welded to the mounting base, in particular by thermal welding;
the inner part of the decoupling ring forms a second recess for receiving a second bearing arranged around the shaft of the rotor;
the elastomeric material fills the entire space between the inner part and the outer part of the decoupling ring;
the inner part of the decoupling ring and/or the outer part of the decoupling ring is/are cylindrical in shape, preferably with rotational symmetry, the inner and outer parts of the decoupling ring also preferably being coaxial;
the recess for receiving the bearing in the inner part of the decoupling ring is substantially cylindrical and has, in cross section, at least one rectilinear or piecewise rectilinear side, the recess preferably having a polygonal cross section;
the motor comprises an electronic motor control board, fixed to the mounting base, the mounting base preferably being made of a heat-conducting material, in particular an aluminum alloy;
the rotor comprises magnets, the stator comprises a winding, and the magnets are radially outside with respect to the winding, with reference to the axis of rotation of the rotor;
the inner part of the decoupling ring and/or the outer part of the decoupling ring is one of:
a metal, in particular an aluminum alloy;
a plastic material, in particular polypropylene, or PP;
at least one bearing is a ball bearing, preferably each bearing is a ball bearing; and
the elastomeric material has a hardness, on the Shore A scale, of between 30 and 70 and/or the elastomeric material is chosen from:

polystyrene-b-poly(ethylene-butylene)-b-polystyrene, or SEBS, ethylene propylene diene monomer, or EPDM.

According to another aspect, the present document proposes a motor assembly, comprising a motor as described hereinabove, in all of its combinations, and a motor support, the motor support comprising a rigid inner ring secured to the mounting base, an outer ring intended to be fixed on a structural element, and a decoupling element between the inner ring and the outer ring.

The decoupling element may include a ring of elastomeric material between the inner ring and the outer ring.

The decoupling element may have a cutoff frequency lower than the cutoff frequency of the decoupling ring.

According to yet another aspect, the present document describes a ventilation device for a motor vehicle ventilation, heating and/or air conditioning system, comprising a motor as described hereinabove, in all its combinations or a motor assembly as described hereinabove, in all its combinations, and a fan impeller fixed to the motor rotor shaft.

BRIEF DESCRIPTION OF THE DRAWINGS

Further features, details and advantages will become apparent on reading the following detailed description, and on studying the appended drawings, in which.

DESCRIPTION OF THE EMBODIMENTS

Figure 1:
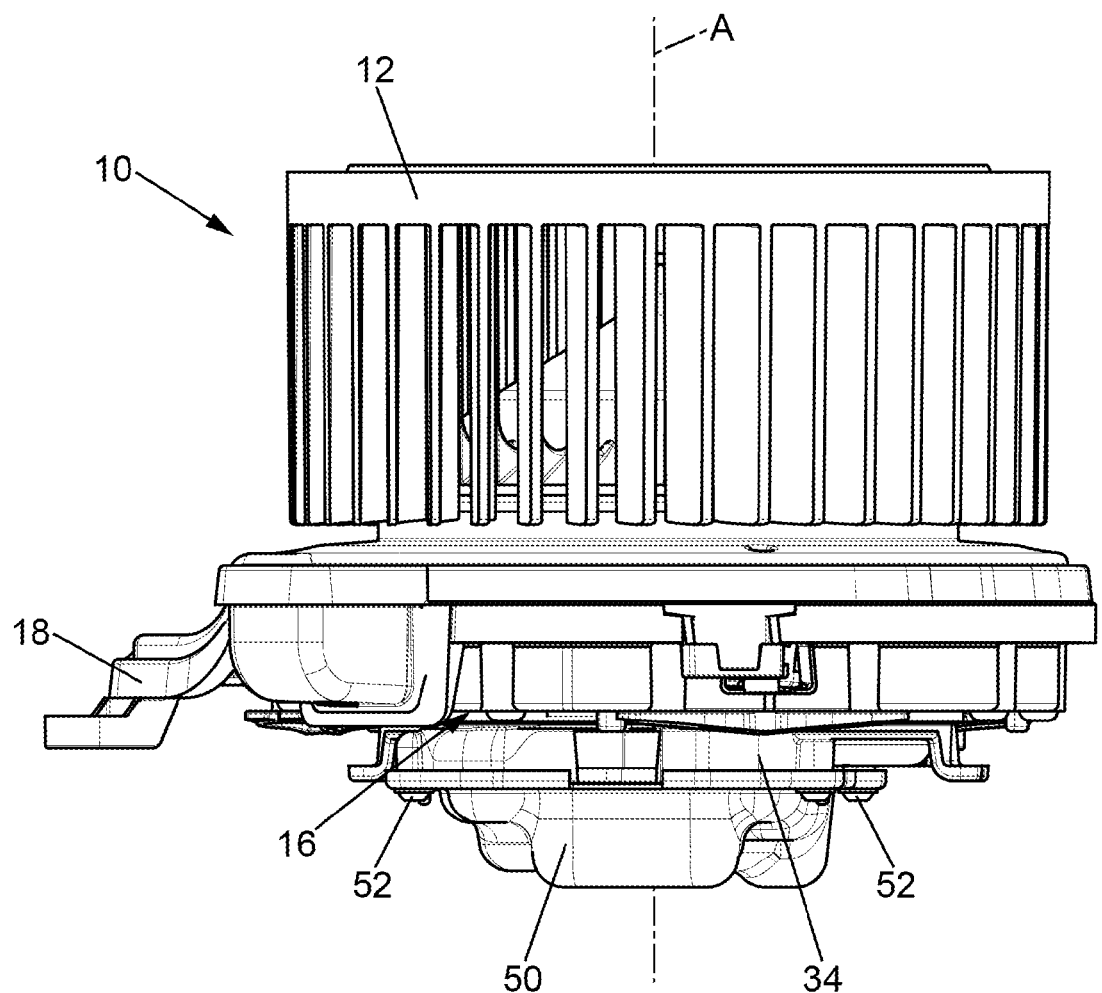
FIG. 1 schematically represents a ventilation device for a ventilation, air conditioning and/or heating system of a motor vehicle.
Figure 2:
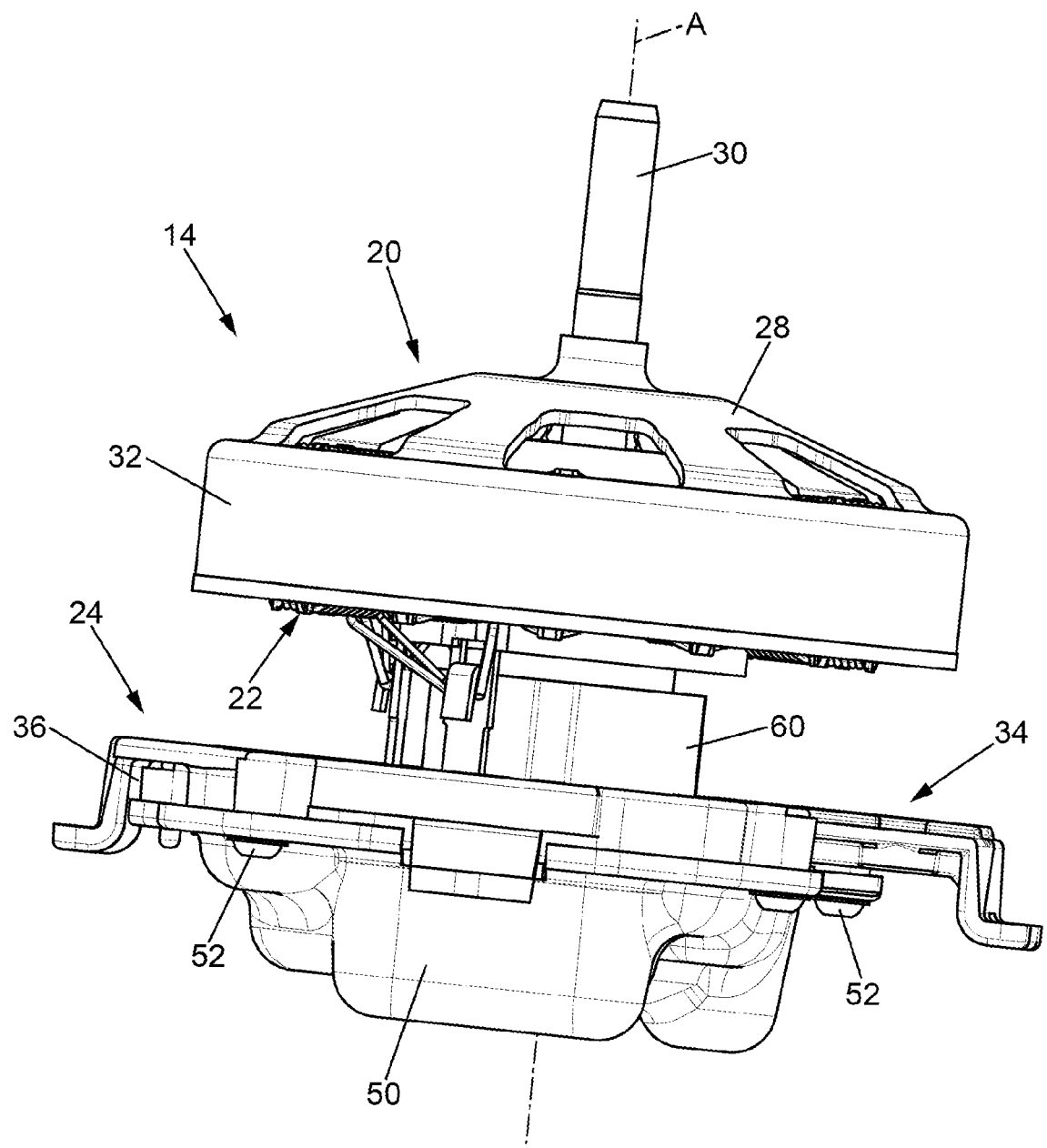
FIG. 2 schematically represents an electric motor that can be implemented in the ventilation device of FIG. 1.

FIG. 1 schematically illustrates a ventilation device 10 for a motor vehicle heating, ventilation and/or air conditioning system. As is conventional, such a heating, ventilation and/or air-conditioning device for a motor vehicle comprises a ventilation circuit, a ventilation device 10 for causing the air to move in the ventilation circuit, and means for heating and/or means for cooling the flow of air set in motion by the ventilation device 10.

The ventilation device 10 essentially comprises, as shown, a fan impeller 12, an electric motor 14, and a support 16 for the electric motor 14. The fan impeller 12 rotates around an axis of rotation A. The electric motor 14 is intended to rotate, around its axis A, the fan impeller 12. The support 16 for the motor 14 is intended to allow the fixing of the ventilation device 10 in a motor vehicle heating, ventilation and/or air conditioning system, by limiting the transmission of the vibrations generated by the electric motor 14 and/or the fan impeller 12 in the motor vehicle and/or external stresses toward the electric motor 14 and/or the fan impeller 12. The support 16 for the motor 14 may in particular comprise two rigid coaxial rings, of axis A, interconnected by a decoupling element made of flexible elastomeric material. The decoupling element between the inner ring and the outer ring can also take the form of a ring. The inner ring may be intended to be fixed to the motor 14. The outer ring may be intended to be fixed to a structural element, for example a deflector 18, of a vehicle heating, ventilation and/or air conditioning system. The elastomer material is for example polystyrene-b-poly(ethylene-butylene)-b-polystyrene or SEBS.

In the following, the motor 14 is described in greater detail.

The motor 14 comprises a rotor 20, a stator 22 and a stator support 24, to allow the motor 14 to be fixed to the motor support 16.

In this instance, the rotor 20 is an external rotor. Thus, the stator 22 associated with the rotor 20 is arranged radially inside the rotor 20. More precisely, the magnets 27 of the rotor 20 are radially outside with respect to the winding 26 of the stator 22, with reference to the axis A of rotation of the motor 14. The winding 26 of the stator can for example comprise three distinct coils, corresponding to three distinct phases.

The rotor 20 has the shape of a perforated cup 28, fixed to a shaft 30. The fan impeller 12 is here fixed directly on the shaft 30. In this instance, the magnets 27 of the rotor 20 are fixed on the internal face of the cup 28, on a cylindrical strip 32 formed by the cup 28.

Here, the stator support 24 has a base 34. The base 34 consists in this case of a base portion 36. Here, the base portion extends generally along a plane normal to the axis A of rotation of the motor 14.

Figure 4:
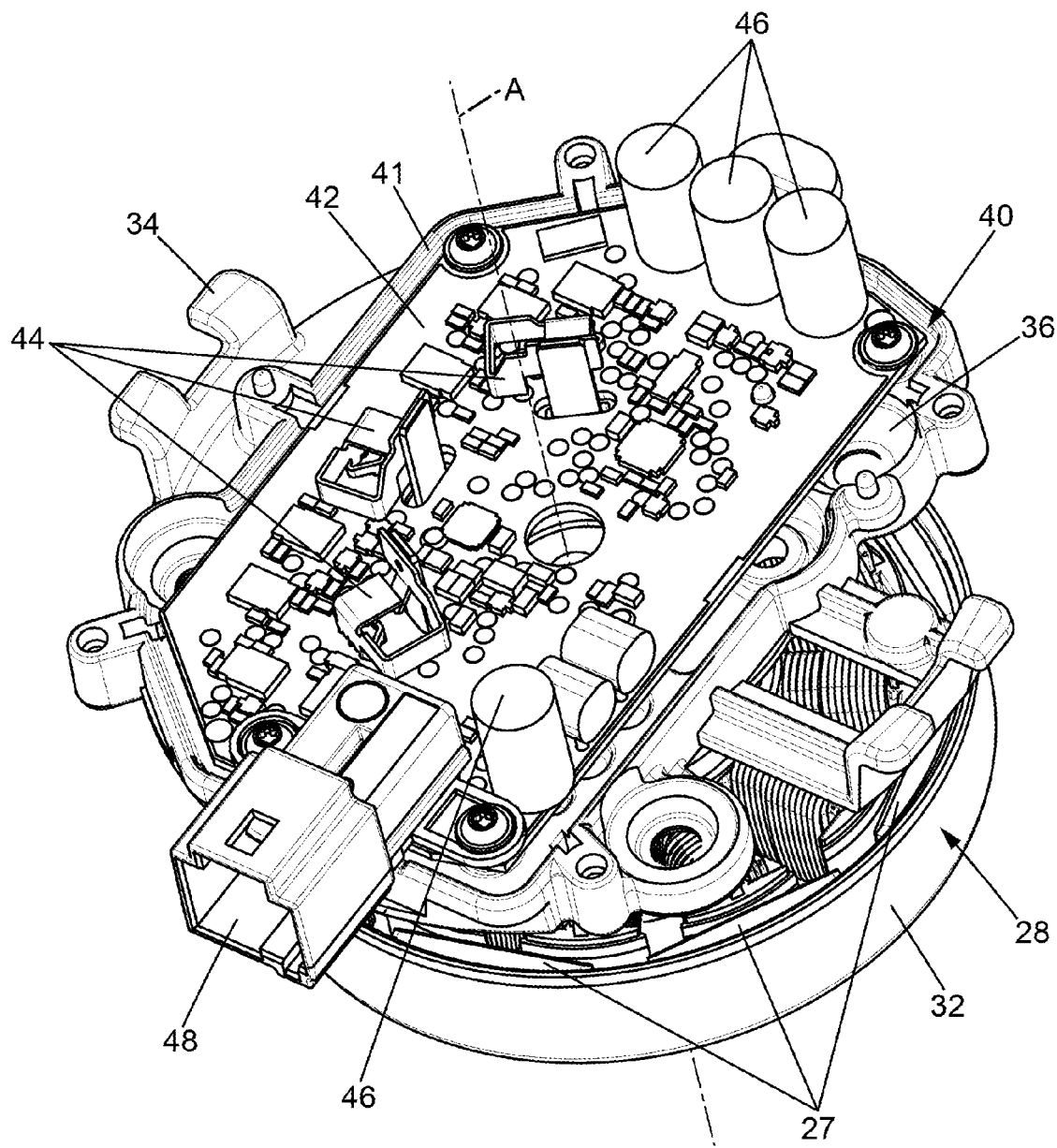
FIG. 4 schematically represents a bottom view of the motor of FIG. 2, of which a cover has been removed to reveal an electronic control board.

As shown more particularly in FIG. 4, the base 34 forms, on its surface opposite that which is intended to face the rotor 20, a depression 40 receiving an electronic board 42 for controlling the motor 14. The depression 40 may be surrounded by a projecting rim 41. Various mechatronic components 44, 46 are fixed on the electronic board 42. In particular, mechanical devices 44 make it possible to connect lugs 43 secured to the winding 26 of the stator 22 to the electronic board 42. Supplying the winding 22 via these lugs 43 can then make it possible to control the electric motor 14. The bulkier components 46, in particular the capacitors, can also be fixed on the electronic board 42, preferably near the edges of the electronic board 42.

A connector 48 is also connected to the electronic board 42. The connector 48 allows the electrical supply of the electronic board 42 and, consequently, of the motor 14.

Finally, a cover 50 is fixed on the base 34. The cover 50 defines here, with the depression 40 in the base 34, a recess for receiving the electronic board 42. The cover 50 is for example fixed to the base 34 by means of screws 52.

The base 34 is advantageously made of a material that is a good heat conductor, to facilitate the cooling of the electronic components fixed on the electronic board 42. Thus, the base 34 is for example made of an aluminum alloy.

Figure 3:
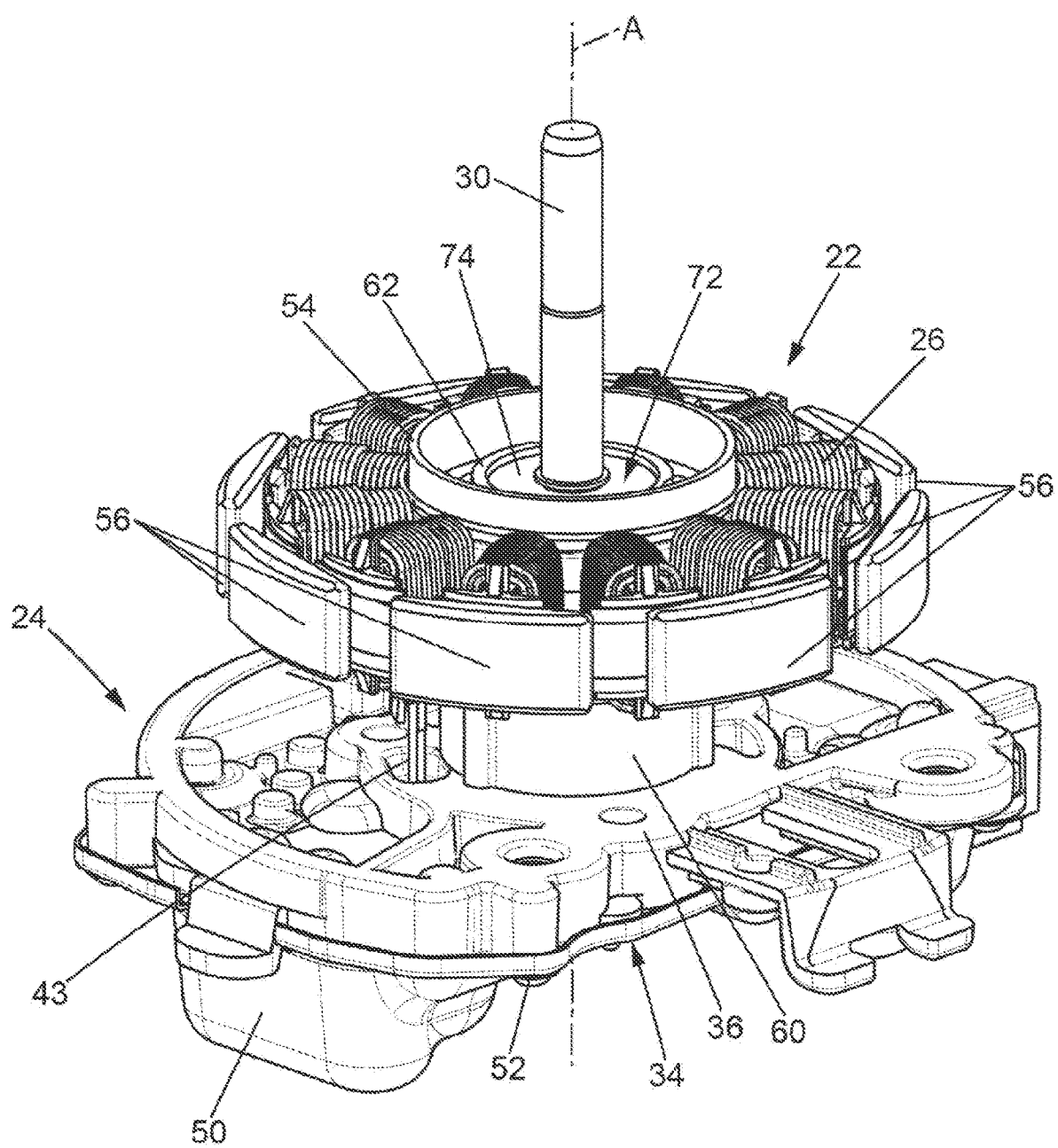
FIG. 3 schematically represents the electric motor of FIG. 2, of which a part of the rotor has been removed.

The stator winding 26 is in the general shape of a star of coils. The stator 22 includes a support 54 for the stator winding 26. The stator winding support 54 is also in the general shape of a star. The stator winding support 54 receives stacks of laminations 56, which, in FIG. 3, are particularly visible at the radial ends of the stator winding support 54.

The motor 14 also includes a decoupling ring 58.

Figure 5:
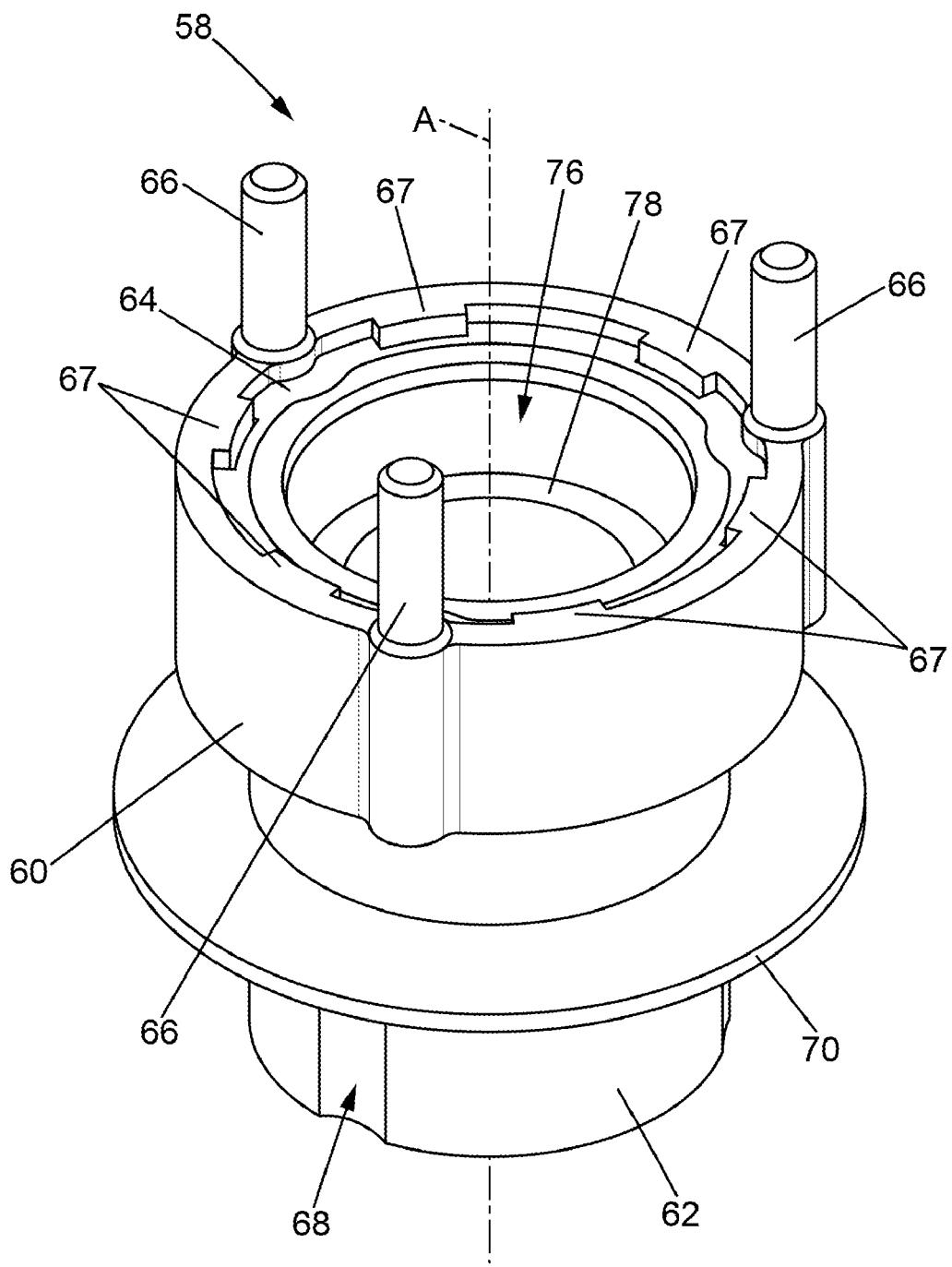
FIG. 5 schematically represents, in perspective, a decoupling ring which can be implemented in the motor of FIG. 2, between the mounting base of the motor and the stator.
Figure 6:
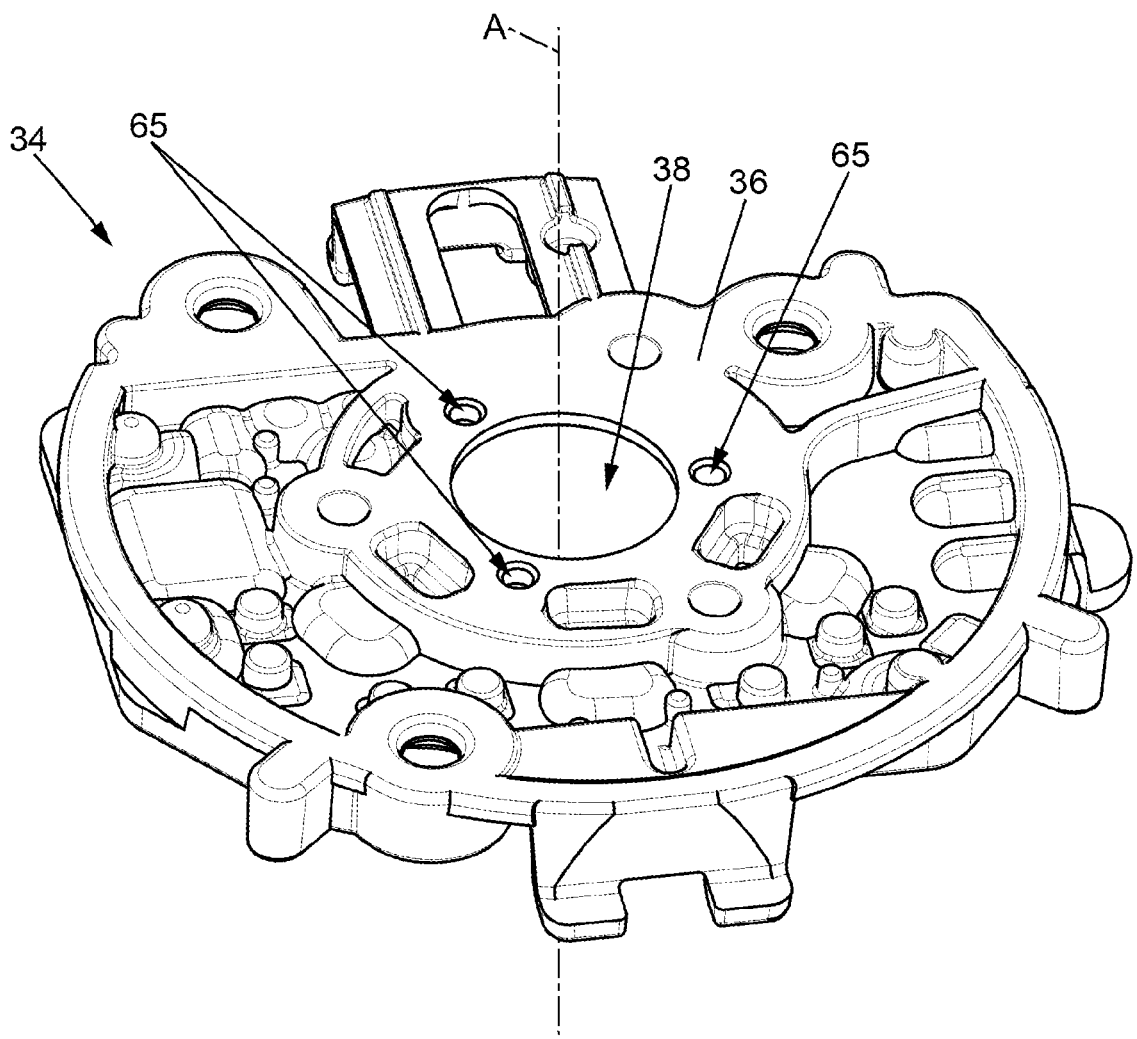
FIG. 6 schematically represents, in perspective, the base for mounting the motor of FIG. 2.

A first example of a decoupling ring 58 is shown in FIG. 5. As illustrated in this FIG. 5, the decoupling ring 58 essentially comprises an outer part 60, an inner part 62 and elastomeric material 64. Preferably, the elastomeric material fills the entire space between the outer part 60 and the inner part 62.

In the illustrated example, the outer part 60 has a cylindrical shape. The inner part 62 has a cylindrical shape. Here, the inner part 62 has a cylindrical shape with symmetry of revolution. The outer and inner parts 60, 62 are coaxial, having as their axis the axis A of rotation of the motor 14. The elastomeric material 64 also has a cylindrical shape.

As shown in FIG. 5, the outer part 60 of the decoupling ring 58 forms pins 66. In this case, the outer part 60 of the decoupling ring 58 forms three pins 66. The pins 66 are regularly distributed angularly around the axis A of the outer part 60. The pins 66 extend in the direction of the axis A of the outer part 60. The pins 66 are intended to be received in complementary openings 65, formed in the base 34, around a central opening 38 in the base 34. The pins 66 can then be welded to the base 34. The pins can be welded by thermal welding, for example by infrared welding. The pins can also be welded by ultrasonic welding. The pins can also be force-fitted into the openings 65 of the base 34. The pins 66 thus allow the fixing of the decoupling ring 58 on the base 34, so that the outer part 60 of the decoupling ring 58 is secured to the base 34.

The outer part 60 may have internal reliefs 67, in particular longitudinal ribs having as their axis the axis A of the outer part 60. These internal reliefs 67 make it possible to limit the rotation of the elastomeric material 64 relative to the outer part 60 of the decoupling ring 58. Similarly, the inner part 62 may have external reliefs, in particular longitudinal grooves having as their axis the axis of the inner part 62, to limit the relative rotation of the elastomeric material 64 with respect to the inner part 62 of the decoupling ring 58.

Furthermore, the inner part 62 of the decoupling ring 58 has, on its outer surface, at least one relief 68 for guiding the position of the stator winding support 54. The stator winding support 54 may have at least one relief complementary to the guide relief 68. In this case, each guide relief 68 on the inner part 62 of the decoupling ring 58 is formed by an axial groove, extending parallel to the direction of the axis A of the outer part. Also, the inner part 62 of the decoupling ring 58 forms a crown 70, substantially normal to the direction of the axis A of the inner part 62. Here the diameter of the crown 70 is greater than the diameter of the rest of the outer part 62 of the decoupling ring 58. The crown 70 can thus serve as a support for the cylindrical winding support 54.

The inner part 62 still forms, as can be seen in FIG. 3, a first recess 72 for receiving a bearing 74 mounted around the shaft 30 of the rotor 20. The bearing 74 is for example a ball bearing. The first recess 72 can be formed by a shoulder inside the inner part 62 of the decoupling ring 58. The first recess 72 is preferably of substantially cylindrical shape. Preferably, before the mounting of the bearing 74 in the first recess 72, the first recess 72 has, in cross section, at least one rectilinear or piecewise rectilinear side. The first recess 72 may have a polygonal cross section, before the insertion of the bearing 74. Thus, the insertion of the bearing 74 in the first recess 72 is done by force, preferably by deforming the first recess 72, so that the bearing 74-in particular its outer ring-is held in the first recess 72, fixed in rotation about the axis A of rotation of the motor 14. More preferably, once the bearing 74 has been installed in the recess 72, the recess has, in cross section, one side having a rectilinear portion. In this case, the rectilinear portion extends for example over a length of between 25% and 75% of the total length of the side. The recess 72 may also retain a polygonal cross section after the insertion of the bearing 74.

As can be seen in FIG. 5, the inner part 62 can also form a second recess 76 for receiving a second bearing 80 mounted around the shaft 30 of the rotor 20.

The second bearing 80 is for example a ball bearing. The second recess 76 can be formed by a shoulder 78 inside the inner part 62 of the decoupling ring 58. The second recess 76 is preferably of substantially cylindrical shape. Preferably, before the second bearing 80 is mounted in the second recess 76, the second recess 76 has, in cross section, at least one rectilinear or piecewise rectilinear side. The second recess 76 may have a polygonal cross section, before the insertion of the second bearing 80. Thus, the insertion of the second bearing 80 in the second recess 76 is done by force, preferably by deforming the second recess 76, so that the second bearing 80—in particular its outer ring—is held in the second recess 76, fixed in rotation about the axis A of rotation of the motor 14. Preferably again, after the positioning of the second bearing 80 in the second recess 76, the second recess 76 has, in cross section, at least one side having a rectilinear portion, the rectilinear portion extending for example over a length of between 25% and 75% of the total length of the side. The second recess 76 may also retain a polygonal cross section after the insertion of the second bearing 76.

Advantageously, the first and second recesses 72,76 are made substantially at the two longitudinal ends of the inner part 62 of the decoupling ring 58.

The inner part 62 of the decoupling ring 58 and/or the outer part 60 of the decoupling ring 58 may in particular be one of:
  a metal, in particular an aluminum alloy; and
  a plastic material, in particular polypropylene (PP), or polybutylene terephthalate (PBT).

The elastomeric material 64 can have a hardness, on the Shore A scale, of between 30 and 70. Alternatively or additionally, the elastomeric material 64 is chosen from:
  polystyrene-b-poly(ethylene-butylene)-b-polystyrene, or SEBS, and
  ethylene propylene diene monomer, or EPDM.

Advantageously, the decoupling element of the motor support 16 has a cutoff frequency lower than the cutoff frequency of the decoupling ring 58. Here, the cutoff frequency means the frequency corresponding to an output power of the filter constituted by the decoupling element, respectively the decoupling ring 58, reduced by half.

Thus, as explained previously, the vibrations propagating from the motor support 16 towards the mounting base 34 are attenuated when they reach the stator 22, by the effect of the elastomeric material 64 of the decoupling ring 58.

Figure 7:
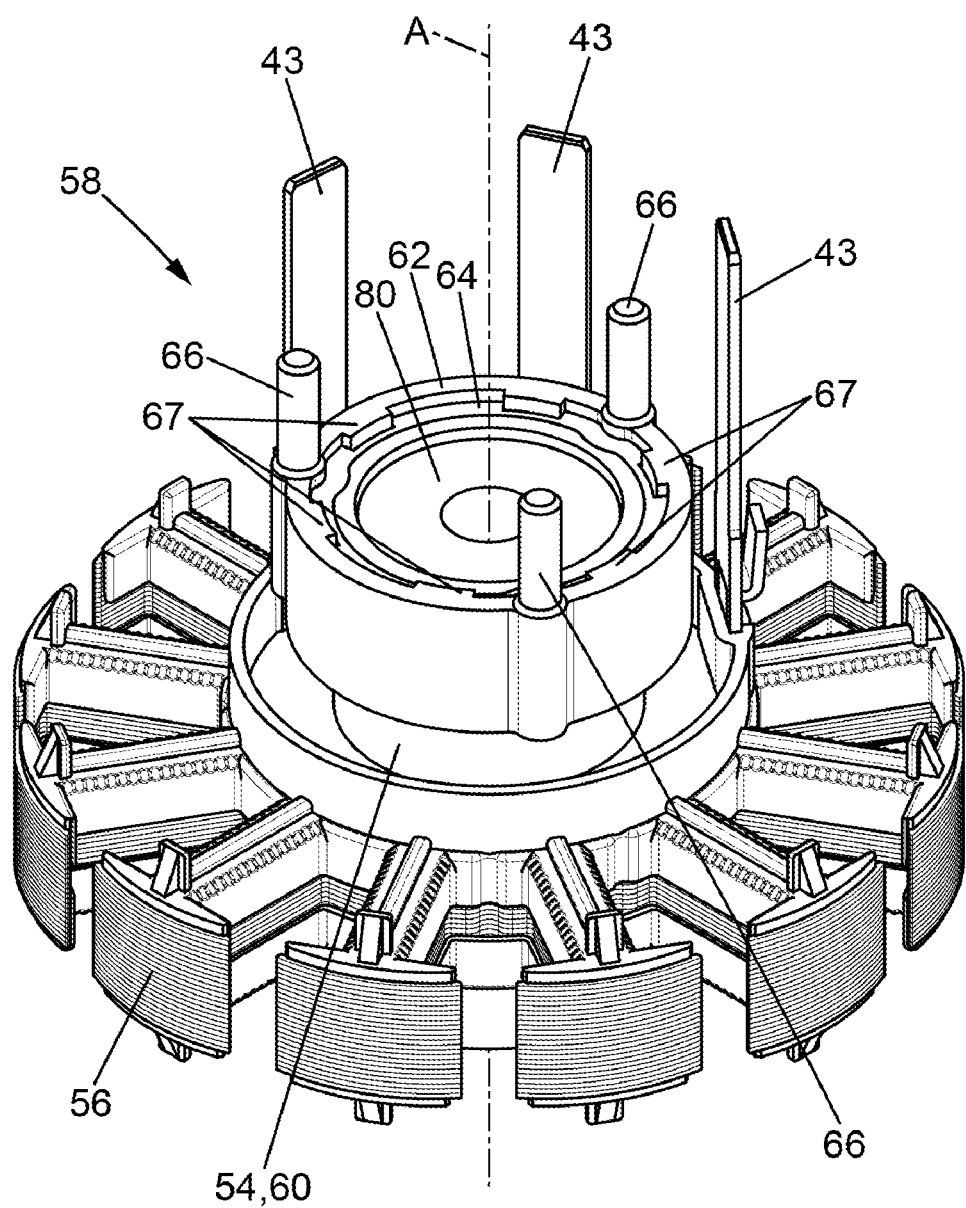
FIG. 7 schematically represents a variant of the decoupling ring which can be implemented in the motor of FIG. 2, forming the motor stator winding support.

FIG. 7 illustrates a variant of the decoupling ring 58. According to this variant, the inner part 62 of the decoupling ring 58 forms the stator winding support 54. In other words, in the example of FIG. 7, the stator winding support 54 is integral with the inner part 62 of the decoupling ring 58. To do this, the inner part 62 of the decoupling ring 58 is, for example, overmolded onto the stacks of laminations 56 of the stator 22. In this case, the inner part 62 of the decoupling ring 58 forming the support for the stator winding 54 is advantageously made of an electrically insulating material, in particular plastic.

This variant has the advantage of easier assembly of the motor 14, as the motor 14 comprises fewer parts.

According to one embodiment, which is not shown, at least one of the bearings 74, 80 can be replaced by a plain bearing. The plain bearing has the shape of a hollow cylinder. An inner surface of the plain bearing receives the shaft 30. The recess 72, 76 receives an outer surface of the plain bearing.

The invention is not limited to the examples presented above but is, on the contrary, capable of numerous variants accessible to those skilled in the art.

The invention claimed is:

1. A motor for a ventilation device of a ventilation, air conditioning and/or heating system of a motor vehicle, comprising:
    a base for mounting the motor on a support;
    wherein the base comprises a surface that includes a depression, and
    wherein an electronic board is fixed inside the depression,
    a stator comprising a stator winding support and a stator winding;
    a rotor comprising a shaft;
    at least one bearing around the shaft of the rotor; and
    a decoupling ring comprising an outer part secured to the mounting base, an inner part secured to the stator and forming at least one recess for respectively receiving the at least one bearing around the shaft of the rotor, and elastomeric material between the inner part and the outer part,
    wherein the inner part of the decoupling ring is made of one piece with the stator winding support.

2. The motor as claimed in claim 1, wherein the inner part of the decoupling ring and the stator winding support being two separate parts, the inner part of the decoupling ring having at least one relief for guiding the position of the stator winding support and the stator winding support.

3. The motor as claimed in claim 1, in which the outer part of the decoupling ring forms pins configured to be received in complementary openings in the mounting base, the pins being welded to the mounting base by thermal welding.

4. The motor as claimed in claim 1, in which the inner part of the decoupling ring forms a second recess for receiving a second bearing arranged around the shaft of the rotor.

5. The motor as claimed in claim 1, in which the elastomeric material fills the annular space between the inner part and the outer part of the decoupling ring.

6. The motor as claimed in claim 1, in which the inner part of the decoupling ring and/or the outer part of the decoupling ring is/are cylindrical in shape, the inner and outer parts of the decoupling ring also being coaxial.

7. The motor as claimed in claim 1, in which the at least one recess for respectively receiving the at least one bearing in the inner part of the decoupling ring is substantially cylindrical and has, in cross section, at least one rectilinear or piecewise rectilinear side, the at least one recess having a polygonal cross section.

8. A ventilation device for a motor vehicle ventilation, heating and/or air conditioning system, comprising a motor as claimed in claim 1; and a fan impeller fixed to the shaft of the rotor of the motor.

9. The motor as claimed in claim 6, wherein the inner part of the decoupling ring and the outer part of the decoupling ring are cylindrical in shape.

* * * * *